3,224,908
METHOD AND COMPOSITION FOR PRODUCING ADHERENT COATINGS ON METAL PARTS
Eduard Duch, Frankfurt am Main, Willy Herbst, Hofheim, Taunus, Fritz Rochlitz, and Hans Scherer, Frankfurt am Main, and Herbert Vilcsek, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Aug. 22, 1961, Ser. No. 133,058
Claims priority, application Germany, Aug. 31, 1960, F 32,011
3 Claims. (Cl. 148—6.15)

This invention relates to a method and composition for producing adherent uniform coatings on metals, particularly for preventing corrosion and providing good adherence of lacquers and varnishes. The invention particularly concerns the coating of metals by contacting them with a solution containing mixtures of monomeric and polymeric substances and subsequently drying the metals thus treated.

According to the process of the invention, metal parts are contacted with a solution containing a monomeric alkene phosphonic acid, preferably vinyl phosphonic acid, and at least one macromolecular substance of vinyl phosphonic acid and/or -phosphorous-free polymers containing acid groups.

As monomeric alkene phosphonic acids there are advantageously used those containing 2 or 3 carbon atoms, i.e. vinyl phosphonic acid ($CH_2=CHPO_3H_2$), propene phosphonic acid (propene-1,2-phosphonic-1-acid, $$CH_3CH=CHPO_3H_2)$$

or allyl phosphonic acid (propene-2,3-phosphonic-1-acid, $CH_2=CHCH_2PO_3H_2$). The preparation of vinyl phosphonic acid is disclosed in U.S. Patent 3,098,865 granted July 23, 1963, on application Ser. No. 645,028, filed March 11, 1957.

As macromolecular substances of vinyl phosphonic acid there are used in accordance with the invention homopolymers of vinyl phosphonic acid and/or copolymers of vinyl phosphonic acid and/or copolymers of acid derivatives of vinyl phosphonic acid which contain, per monomer unit, only one free hydroxyl group at the phosphorus atom. The preparation of a vinyl phosphonic acid homopolymer by polymerizing the monomer dissolved in an unpolymerizable organic liquid which is a non-solvent for the homopolymer, in the presence of a free radical polymerization catalyst at temperatures of from 10° to 150° C., is taught in copending application Ser. No. 405,870, filed October 22, 1964. This application is a continuation-in-part of application Ser. No. 67,915, filed November 8, 1960, now abandoned. Copolymers of vinyl phosphonic acid and its derivatives can be prepared by solution, emulsion, suspension, or bulk polymerization processes by heating and/or with irradiation by ultraviolet light and/or by adding a radical-yielding catalyst, at atmospheric pressure, in vacuo, or at super-atmospheric pressure at a polymerization temperature between about −10° C. and about 300° C., preferably between 5° C. and 130° C. The preparation of such copolymers is disclosed in U.S. patent applications Ser. No. 80,532, filed January 4, 1961, and Ser. No. 89,342, filed February 15, 1961, now both abandoned. The latter application in particular discloses the preparation of vinyl phosphonic acid semi-esters by the reaction of vinyl phosphonic acid dichloride with water and an alcohol at −40° C. to 120° C.

As suitable components for the copolymers of vinyl phosphonic acid and/or the copolymers of the acid derivatives of vinyl phosphonic acid which contain one free hydroxy group per monomer unit at the phosphorus atom, advantageously the semi-esters of vinyl phosphonic acid, there may be used organic compounds containing one or more olefinic bonds and having a substantially polar character, for example, acrylic acid, methacrylic acid, the esters, amides and nitriles of acrylic or methacrylic acid, vinyl esters such as vinyl acetate and vinyl propionate, maleic anhydride and crontonic acid.

As phosphorus-free polymers containing acid groups which as such do not prevent corrosion or yield only insufficient corrosion protection in practice, polyacrylic acid or copolymers of vinyl alkyl ethers, for example vinyl methyl ether, and maleic anhydride may advantageously be used.

As the polymer component for the solutions to be used in accordance with the invention, two or more of the above-mentioned homopolymers and/or copolymers may be used.

The most advantageously mixing proportion of alkene phosphonic acid and polymer in the solution depends substantially on the nature of the polymer component used, but the ratio by weight of monomeric phosphonic acid to polymer is within the range of 98:2 to 20:80. In general, however, a proportion of less than 10% by weight of polymer in the solution is sufficient for obtaining good corrosion protection. Solutions which contain only alkene phosphonic acid, for example vinyl phosphonic acid, do not, in general, provide sufficient corrosion protection in practice; they may, however, be used for special purposes.

The concentration of alkene phosphonic acid and polymer in the solutions of the invention may be within the range of about 0.1% by weight to about 15% by weight of the solution and depends substantially on the intended use. For most fields of application, a concentration of about 0.8 to about 6% by weight has proved advantageous. Solutions containing a total of alkene phosphonic acid and polymer of about 0.8 to about 6% by weight provide a good corrosion protection on metal parts which are subsequently coated with a lacquer or varnish. The coatings so obtained impart also a good lacquer and varnish adhesion to the metal parts. When the concentration is increased, for example to 9% by weight, the lacquer and varnish adhesion is reduced. When it is so desired, however, to protect, for example, metal parts which have been pickled with an acid, prior to further treatment temporarily against corrosion, for example for about 4 to 6 weeks, without subsequent lacquering or varnishing, solutions containing about 0.5 to about 15% by weight, preferably 1 to 8% by weight, of monomeric alkene phosphonic acid and polymer are advantageously used.

As solvents for the alkene phosphonic acids and the polymers there may be used, besides water, aliphatic alcohols with 1 to 4 carbon atoms in the molecule, advantageously isopropanol, or mixtures of water and the aforesaid aliphatic alcohols.

It is also advantageous to use solutions that contain a wetting agent such as a non-ionogenic wetting agent in addition to alkene phosphonic acid and polymer. As wetting agents, commercially available products in usual concentrations may be used when the solvent is water or a mixture of water and organic solvent in which the predominant part is water.

For carrying out the process of the invention on an industrial scale, the metal surfaces are treated for a short time within the range of 3 minutes to 3 seconds with the above mentioned solutions at a temperature of from about 4° C. to about 70° C. and then dried at a temperature within the range of about 80 to about 200° C., advantageously 100° to 180° C. The most suitable drying temperature and the most advantageous time of immersion are given by the solvent or solvent mixture used and the nature and concentration of the monomeric component of the solution. The solution may be applied to the metal parts in known manner, for example by spraying, immersion, flooding or application with a rag or brush.

The present invention relates also to the solutions to be used in the process of the invention. The solutions of the invention contain alkene phosphonic acids, advantageously vinyl phosphonic acid and polyvinyl phosphonic acid and/or homopolymers of the acid derivatives of vinyl phosphonic acid which contain, per monomer unit, only one free hydroxyl group at the phosphorus atom, advantageously the semi-esters of vinyl phosphonic acid, and/or copolymers of vinyl phosphonic acid and/or copolymers of the acid derivatives of vinyl phosphonic acid and/or phosphorus-free polymers containing acid groups, advantageously polyacrylic acid and/or copolymers of vinyl alkyl ethers and maleic anhydride, dissolved in water and/or aliphatic alcohols with 1 to 4 carbon atoms in the molecule, advantageously isopropanol. As components of the copolymers of vinyl phosphonic acid and the copolymers of the acid derivatives of vinyl phosphonic acid organic compounds containing one or more olefinic bonds may be used, advantageously acrylic acid, methacrylic acid or the esters, amides or nitriles of acrylic or methacrylic acid, vinyl esters, maleic anhydride or crotonic acid.

The use of mixtures of alkene phosphonic acid and polymer in accordance with the present invention offers considerable economical advantages. For example, it is unnecessary in the manufacture of polymers in solvents to wait for the termination of the polymerization and to isolate the polymer in an appropriate manner. Products that have been polymerized only partially, even those which contain only a small amount of polymer in addition to the monomer, may, in fact, successfully be used.

It is also possible to obtain the solutions of the present invention directly by dissolving the individual components, i.e. the monomeric product and the polymer obtained, for example, by precipitation polymerization, in the solvent or solvent mixture. The solutions to be used for treating the metal parts may be obtained in a simple manner by diluting the polymerization solution, for example, with water.

By an appropriate choice of the polymer it is furthermore possible to adapt the corrosion-preventing properties of the solutions to the requirements in a given case.

The mixtures of alkene phosphonic acid and polymer to be used in accordance with the invention have the further advantage that even polymers may be successfully used which, when used alone, offer no only insufficient corrosion protection and partially impart a poor lacquer and varnish adhesion to the metal parts treated.

When the metal parts treated according to the process of the invention were subjected to the conventional corrosion tests, it was found that the pure polymer solutions already led to a maximum corrosion protection. More severe test methods had therefore to be developed to determine grades of the quality of the corrosion protection obtained. It was ascertained that the corrosion protection obtained on metal parts with the mixture of alkene phosphonic acid and polymer in accordance with the invention is even somewhat superior to that obtained with pure polymer solutions.

The following examples serve to illustrate the invention but they are not intended to limit it thereto.

Example 1

Steel plates of class ST VIII, as characterized by Deutsche Industrie Norm. DIN 1623, were treated for 10 minutes at boiling temperatures with a commercially available degreasing agent which had been rendered alkaline and contained emulsifiers and silicates, rinsed with cold water and subsequently immersed for 10 seconds in a solution at 44° C. which contained 27 grams of vinyl phosphonic acid and 3 grams of a copolymer of vinyl phosphonic acid and acrylic acid (molar ratio 1:1) in 970 grams of water. The plates were then dried for 4 minutes at 130° C. in a drying closet and coated with an alkyd resin baking varnish in two stages (primer and enamel) at a baking temperature of 145° C., the baking time amounting to 25 minutes. The plates thus treated were subjected to usual and more severe corrosion and lacquer and varnish adhesion tests, excellent test results being obtained.

A similar, very good corrosion protection was obtained with solutions of the following composition, the conditions being the same unless otherwise stated:

(a) 4.1 grams vinyl phosphonic acid and 15.7 grams polyacrylic acid dissolved in 1000 grams water, time of immersion about 20 seconds, temperature of the bath about 20° C., drying temperature 180° C.;

(b) 14.8 grams vinyl phosphonic acid and 15 grams polyacrylic acid dissolved in 1000 grams water, time of immersion about 20 seconds, temperature of the bath 4° C.;

(c) 24.4 grams vinyl phosphonic acid and 5.6 grams of a commercially available copolymer of vinyl methyl ether and maleic anhydride dissolved in 1000 grams water, time of immersion about 20 seconds, temperature of the bath about 20° C.;

(d) 28 grams vinyl phosphonic acid and 12 grams of a copolymer of vinyl phosphonic acid and vinyl acetate (molar ratio 2:1) dissolved in 1000 grams water, time of immersion 5 seconds, temperature of the bath about 20° C., drying temperature 110° C.;

(e) 24.2 grams vinyl phosphonic acid and 2.7 grams of a copolymer of vinyl phosphonic acid monoethyl ester and vinyl acetate (molar ratio 1:1) dissolved in 1000 grams water, time of immersion 1 minute, temperature of the bath about 20° C.;

(f) 16 grams propene phosphonic acid and 7 grams of a copolymer of vinyl phosphonic acid and acrylic acid (molar ratio 2.13:1.0) dissolved in 1000 grams water, temperature of the bath about 20° C.;

(g) 20 grams vinyl phosphonic acid, 4 grams polyacrylic acid and 6 grams of a copolymer of vinyl phosphonic acid and acrylonitrile (molar ratio 4.02:1) dissolved in 1000 grams water, temperature of the bath about 20° C.;

(h) 23 grams allyl phosphonic acid and 7 grams polyvinyl phosphonic acid dissolved in 1000 grams water temperature of the bath about 20° C.;

(i) 29.2 grams vinyl phosphonic acid and 0.8 gram polyvinyl phosphonic acid dissolved in 1000 grams water, temperature of the bath about 20° C., drying temperature 110° C.;

(k) 43 grams vinyl phosphonic acid and 1.7 grams of a copolymer of vinyl phosphonic acid and acrylic acid methyl ester (molar ratio 1:5.19) dissolved in 1000 grams water, temperature of the bath about 20° C.;

(l) 8 grams vinyl phosphonic acid and 4 grams of a copolymer of vinyl phosphonic acid and acrylic acid (molar ratio 3.11:1) and wetting agent dissolved in 1000 grams water, temperature of the bath about 20° C., drying temperature 150° C.;

(m) 17 grams vinyl phosphonic acid and 13 grams of a copolymer of vinyl phosphonic acid and acrylic acid (molar ratio 1:1.29) dissolved in 1000 grams water, temperature of the bath about 20° C.;

(n) 6 grams vinyl phosphonic acid and 3 grams of a copolymer of vinyl phosphonic acid and acrylic acid (molar ratio 1:5.9) and wetting agent dissolved in 1000 grams water, time of immersion 3 minutes, temperature of the bath 11° C.

Example 2

Degreased steel plates of class ST VIII were treated in a spraying plant for 30 seconds at a spraying pressure of 0.6 atmosphere (gage) at room temperature with a solution of 11 grams of monomeric vinyl phosphonic acid and 9 grams of polymeric vinyl phosphonic acid in 980 grams of water and then dried for 5 minutes at 135° C. in a drying closet. The plates were then coated with a varnish in three stages as usual for car bodies. A very good corrosion protection and an excellent varnish adhesion were obtained.

*Example 3*

Scaled plates of class VIII were pickled for 10 minutes with commercially available inhibited hydrochloric acid, rinsed with cold water and immersed for 20 seconds in a solution of the following composition:

| | Grams |
|---|---|
| Vinyl phosphonic acid | 42 |
| Polyvinyl phosphonic acid | 18 |
| Isopropanol | 610 |
| Water | 330 |

The plates thus treated were dried for 5 minutes at 130° C. and suspended in a hood in which a concentrated hydrochloric acid solution had been heated to the boil in the day-time. Whereas pickled plates which had not been treated with the solution of the invention were already rusty after about 1 hour, the test samples treated according to the invention showed no rust formation within 4 weeks.

We claim:

1. A method for producing adherent uniform coatings on clean metal, particularly for preventing corrosion and providing adherences of lacquers and varnishes, which comprises the steps of contacting said metal for from 3 minutes to 3 seconds with a solution at a temperature of from about 4° C. to about 70° C., said solution containing at least one monomeric alkene phosphonic acid selected from the group consisting of vinyl phosphonic acid, propene-2,3-phosphonic-1-acid, and propene-1,2-phosphonic-1-acid, and at least one compound selected from the group consisting of polyvinyl phosphonic acid, copolymers of vinyl phosphonic acid, copolymers of the acid derivatives of vinyl phosphonic acid which contain, per monomer unit, only one free hydroxyl group at the phosphorus atom, polyacrylic acid and a copolymer of vinyl methyl ether and maleic anhydride, the components of the said copolymers of vinyl phosphonic acid and the copolymers of the acid derivatives of vinyl phosphonic acid comprising at least one substance selected from the group consisting of acrylic acid, acrylic acid alkyl esters, methacrylic acid, vinyl acetate, maleic anhydride and acrylonitrile, the total concentration of said substances being within the range of about 0.8 to about 6% by weight of said solution and the ratio by weight of monomeric phosphonic acid to polymer being within the range of 98:2 to 20:80, and finally drying the solution adhering to said clean metal to form an adherent coating thereon.

2. A method as described in claim 1 wherein said solution contains as a solvent at least one member selected from the group consisting of water and aliphatic alcohols with 1 to 4 carbon atoms.

3. A method as described in claim 1 wherein said solution additionally contains a non-ionogenic wetting agent.

References Cited by the Examiner

FOREIGN PATENTS 1,049,191  1/1959  Germany.

OTHER REFERENCES

Kosolapoff: "Organo-phosphorous Compounds," John Wiley and Sons, Inc., New York (1950), p. 149.

RICHARD D. NEVIUS, *Primary Examiner.*

WILLIAM D. MARTIN, *Examiner.*